Oct. 9, 1951 — C. A. MIZEN — 2,571,051
DIRECTION FINDER SYSTEM
Filed March 1, 1946
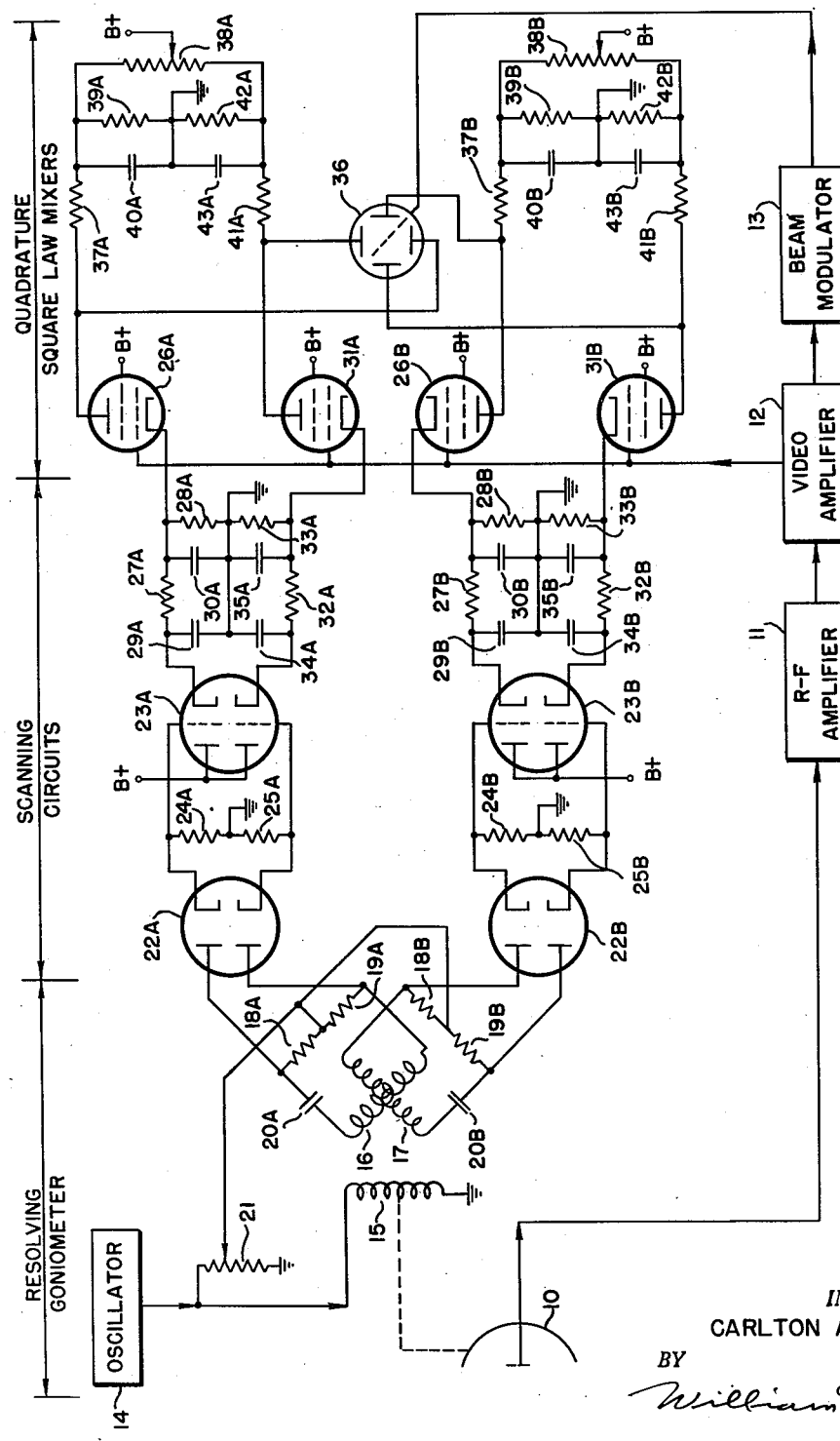
INVENTOR.
CARLTON A. MIZEN
BY
William D. Hall
ATTORNEY Patented Oct. 9, 1951

2,571,051

UNITED STATES PATENT OFFICE 2,571,051

DIRECTION-FINDER SYSTEM

Carlton A. Mizen, Cambridge, Mass., assignor to the United States of America as represented by the Secretary of War Application March 1, 1946, Serial No. 651,313

5 Claims. (Cl. 343—118)

This invention relates generally to electrical apparatus and more particularly to a direction finder system, utilizing a square law vacuum tube characteristic.

In direction finding systems utilizing a cathode ray tube (hereinafter to be referred to as a CRT) for presenting information, it is generally desirable to use a circular sweep synchronized with a scanning antenna such that the reception of a signal results in a radial deflection having an amplitude dependent upon the strength of the received signal, disposed on the screen of the CRT at an angular position corresponding to the angular position of the receiving antenna. Such a CRT presentation admits maximum accuracy and utility for a given CRT.

Various attempts have been made to provide such a CRT display of information, but such methods as have been previously used contained errors inherent in devices requiring a multiplicity of rotating mechanical parts. Some of these systems have used selsyn driven deflection yokes which were physically rotated about an electromagnetic type CRT. Others have used rotating contacts on potentiometers or rotating condensers for providing quadrature voltages for application to the deflection plates of an electrostatic type CRT for obtaining a circular sweep.

For increased accuracy and ease in alignment, physically rotatable synchronized elements should be reduced to a minimum.

It is an object of the present invention to increase the accuracy of a CRT presentation in a direction finding system.

It is also an object to provide a type of CRT presentation for direction finding systems in which the CRT beam is deflected radially from the center an amount proportional to the received signal strength and in which the angular position of this radial deflection corresponds to the angular position of the receiving antenna at the time the signal is received.

It is another object to provide a radial deflection, circular sweep type of CRT presentation with only one physically rotating element, thereby increasing accuracy and dependability.

An example of an apparatus employing the principles of this invention includes a resolving goniometer, a scanning circuit and a mixer circuit, used in conjunction with conventional components of a direction finding system. More specifically, a goniometer having its rotor physically connected to rotate in synchronism with a directional rotatable antenna, has its rotor electrically excited by an audio frequency oscillator. The goniometer has two stator windings which are spaced 90° apart, and from these windings quadrature scanning voltages are obtained for actuating a scanning circuit comprising four channels, each channel consisting of a diode and a cathode follower. Each cathode follower modulates the cathode of a quadrature square law mixer tube whose plate circuit provides a voltage for one of four deflection plates of a conventional electrostatic type CRT. Video signals are mixed with the scanning signals in the quadrature square law mixer tubes by applying video signals to the control grids of each mixer tube.

Thus it is seen that video signals applied to the control grids of the mixer tubes in combination with scanning voltages applied to the cathodes of the mixer tubes, results in a radial deflection from the center of the CRT each time a video signal is received and that this radial deflection is angularly positioned about the face of the CRT corresponding to the goniometer rotor position and hence the receiving antenna position.

Other objects, features and advantages of this invention will suggest themselves to those skilled in the art and will become apparent from the following description of the invention taken in connection with the single figure of the accompanying drawing in which apparatus employing the principles of this invention are shown schematically in conjunction with a block diagram of conventional direction finding system components.

Referring now to the figure of the drawing, conventional components of a direction finding system are shown including a rotatable directional antenna 10, a radio frequency amplifier 11, a video amplifier 12, a beam modulator 13 and an audio frequency oscillator 14. A resolving goniometer comprising a rotor 15 and two stator windings 16 and 17 90° apart has its rotor 15 physically connected to antenna 10 and is electrically excited by oscillator 14. Goniometer stator winding 16 is electrically positioned with respect to ground potential by resistors 18A and 19A, condenser 20A and bucking resistor 21. Stator winding 16 is connected to the anodes of a dual diode 22A whose two cathodes drive a dual triode cathode follower 23A. Resistors 24A and 25A are connected between the two grids of cathode follower 23A and ground. One cathode of cathode follower 23A is connected to the cathode of a tetrode mixed tube 26A through a resistor condenser network comprising resistors 27A and 28A and condensers 29A and 30A. Similarly the other cathode of cathode follower 23A is connected to the cathode of a tetrode mixer tube 31A through a resistor condenser network comprising resistors 32A and 33A and condensers 34A and 35A. The anode of mixer tube 26A is connected to a deflection plate of CRT 36 and to a source of positive potential through resistors 37A and 38A. A resistor condenser network comprising resistor 39A and condenser 40A is connected between resistor 37A and 38A and ground. Similarly the anode of tube 31A is connected to a second deflection plate of CRT 36 and to a source of positive potential through resistors 38 and 41A. A network comprising resistor 42A and a condenser 43A is connected between resistors 38A and 41A and ground.

There has been described a circuit which is controlled by voltages from goniometer stator winding 16. A second identical circuit is controlled by goniometer stator winding 17 and corresponding components of these two circuits have been given the same reference numbers except that the reference numbers of the second mentioned circuit components carry the subscript "B" instead of "A."

The control grids of mixer tubes 26A, 26B, 31A and 31B are all connected together and are also connected to an output of video amplifier 12. A beam modulator 13 controlled by video signals from video amplifier 12 is connected to the intensity control grid of CRT 36.

This invention involves two basic principles, the fact that two sine wave voltages, 90° out of phase with each other, applied to the deflection plates of an electrostatic CRT produces a circular sweep and the fact that the square law characteristic of vacuum tubes permits the mixing of two signals.

A goniometer comprising a rotor winding 15 and two stator windings 16 and 17 has its rotor winding 15 excited by a sinusoidal audio frequency voltage from oscillator 14. Stator windings 16 and 17 are oriented with respect to each other such that sinusoidal voltages induced in these stator windings by rotor 15 have root mean square values (hereinafter referred to as RMS values) which vary as $K \sin \theta$ and $K \cos \theta$, where $\theta$ is the angular position of the goniometer rotor 15 and K is a constant. That is, the RMS value of voltage induced in stator winding 16 varies as $K \sin \theta$ and the RMS value of voltage induced in stator winding 17 varies as $K \cos \theta$ as rotor 15 is rotated. A second sine wave voltage of the same phase and frequency as the voltage which energizes rotor 15 is added to the two output voltages of stator windings 16 and 17. This second sine wave voltage, when added in phase opposition to the two output voltages of stator windings 16 and 17 as by application across the respective stator coils at the midpoint of resistances 18 and 19 (A, B,) respectively, produces four resultant quadrature voltages, the RMS magnitudes of which relate to each other as $$K \sin \theta, \; K \sin \left(\theta - \frac{\pi}{2}\right), \; K \sin (\theta - \pi)$$

and $$K \sin \left(\theta - \frac{3\pi}{2}\right)$$

Adjustment of potentiometer 21 enables the bucking or opposing voltage magnitude to be selected to accomplish the above phase relationships. Condensers 20A and 20B have been placed in series with stator windings 16 and 17, respectively, to prevent any direct current from circulating through windings 16 and 17.

The four output voltages from the four terminals of the two goniometer stator windings 16 and 17 are each fed to a scanning circuit comprising a rectifier and a cathode follower. Dual diode tubes 22A and 22B accomplish rectification and their outputs are fed to four cathode follower stages, consisting of dual triodes 23A and 23B. The output of each cathode follower section of tubes 23A and 23B modulates the cathode of one of four identical quadrature square law mixer tubes, 26A, 26B, 31A and 31B. The anode of each of the four mixer tubes 26A, 26B, 31A and 31B is connected to a deflection plate of CRT 36.

Thus it is seen by following the signal of oscillator 14 through the resolving goniometer circuit, the scanning circuit, and then the quadrature square law mixer circuit, that the resultant scanning voltages applied to the deflection plates of CRT 36 are of equal maximum value and that these four voltages are in quadrature.

For example, if the voltage on one deflection plate has a reference phase of zero degrees, the succeeding deflection plate voltages have a phase of 90°, 180°, and 270°, respectively, resulting in a circular sweep being traced around the face of CRT 36 as goniometer rotor winding 15 is rotated.

Having obtained a circular sweep it is then necessary to inject video signals into some part of the above mentioned circuit to obtain a radial deflection on the scope when a video signal is present. To accomplish this, the square law characteristic of vacuum tubes is utilized and video signals are fed from video amplifier 12 to each of the control grids of tubes 26A, 26B, 31A and 31B in which mixing of video signals and scanning signals is accomplished. The plate circuits of the quadrature square law mixer tubes 26A, 26B, 31A and 31B contain both the video signals and the scanning signals and these voltages applied to the deflection plates of CRT 36 obtain the desired circular sweep accompanied by radial deflections when video signals are present.

The brilliance or intensity control grid of CRT 36 is normally biased to prevent a spot or trace from being visible on the CRT screen and a beam modulator 13 is connected to this intensity grid to increase the brilliance of intensity of the spot or trace on the CRT screen when video signals are present. As is the usual practice, this beam modulator 13 is controlled by output voltages from video amplifier 12.

Thus a direction finding system cathode ray oscilloscope presentation has been obtained wherein a signal from a radio frequency transmitter causes a radial deflection whose angular position on the CRT screen indicates the corresponding azimuth bearing of the receiving antenna and consequently the azimuth bearing of the signal source.

To obtain the greatest possible accuracy, the resolving goniometer should be mounted integral with the receiving antenna 10 to eliminate the necessity of selsyns and their attendant angular lag hunting for synchronism, bearing friction losses and mechanical load resonances.

In a direction finding system utilizing the present invention, except for the resolving goniometer rotor 15, there are no moving elements to admit azimuth inaccuracies. An additional characteristic of this invention, which is usually an important factor, particularly in airborne equipment, is the relatively low power requirement. Since tubes 26A, 26B, 31A and 31B are operated with a high bias value necessary to obtain square law characteristics, the quiescent value of required direct current is low.

While there has been here described what is at present considered to be the preferred embodiment of the invention, it will be obvious to those skilled in the art that various changes and modifications may be made therein without departing from the scope of the invention.

What is claimed is:

1. In a direction finding system for the reception of radio frequency signals, a rotatable directional receiving antenna, a resolving goniometer having a rotor winding and two stator windings with said rotor winding mechanically linked to rotate in synchronism with said antenna and means for applying a sine wave voltage to said windings, the output of said stator windings consisting of four resultant quadrature voltages, a scanning circuit connected to said stator windings having four separate identical channels each comprising a diode rectifier and a cathode follower connected to rectify and to translate one of said four resultant voltages, a cathode ray tube having beam deflection plates and an intensity control, and a quadrature square law mixer circuit having four separate identical channels each comprising a vacuum tube having at least an anode, a control grid and a cathode, the instantaneous value of cathode bias being determined by the output of one of said four cathode followers said cathodes being respectively connected to be supplied the translated outputs of said cathode followers, a video amplifier connected to be supplied from said antenna having a common output connection to said control grids and each of said anodes connected to a deflection plate of said cathode ray tube and means connecting said video amplifier to said intensity control, whereby the anode voltage of each of said vacuum tubes is in quadrature with respect to the other anode voltages and proportional to both the angular position of said antenna and the strength of a video signal resulting in a circular sweep accompanied by radial deflections whose positions correspond to the angular positions of said antenna.

2. In a direction finding system for the reception of radio frequency signals, a rotatable directional antenna, a resolving goniometer physically linked to rotate in synchronism with said antenna, a source of sine wave voltage electrically connected to said goniometer the output of said goniometer consisting of four quadrature voltages, a scanning circuit having four separate identical channels each comprising a rectifier and an amplifier connected to said goniometer, a quadrature square law mixer circuit comprising four separate identical channels, a source of a video signal connected to said mixer circuit to be mixed with each of four output voltages of said scanning circuit and an electrostatic type cathode ray tube having four deflection plates, said plates being connected to an output of one of said square law mixer channels whereby said cathode ray tube presentation consists of a circular sweep upon which is superimposed a video signal producing a radial deflection disposed about the face of said cathode ray tube corresponding to the angular position of said antenna.

3. In a direction finding system for the reception of radio frequency signals, a rotatable receiving antenna, a cathode ray tube indicator system including a since wave source, a resolving goniometer excited from said source and mechanically connected to rotate in synchronism with said antenna, rectifier means connected to the output of said goniometer, a video amplifier connected to said antenna, mixer means connected to said amplifier and said rectifier means for combining video signals of said amplifier with scanning voltages from said rectifier means and an electrostatic type cathode ray tube having an intensity control and deflection plates, said plates being connected to the output of said mixer means and said intensity control to said amplifier.

4. A radio direction-finding system, comprising a rotatable directional receiving antenna, means for providing four scanning voltages in quadrature with respect to one another in synchronism with the rotation of said antenna, means for deriving video signals from said antenna, four square-law-type mixing circuits connected to be supplied from said providing means and said video signal deriving means, and a cathode ray tube oscilloscope having deflection plates and an intensity control, said plates being connected respectively to said four mixing circuits and said intensity control being connected to said signal deriving means.

5. A radio direction-finding system, comprising a rotatable directional receiving antenna, scanning voltage deriving means synchronized with the rotation of said antenna, means for deriving video signals from said antenna, square-law signal mixing circuit means connected to receive the output of said scanning and said deriving means, and a cathode ray oscilloscope having a ray deflection system and an intensity control respectively connected to said mixing means and said deriving means.

CARLTON A. MIZEN.

REFERENCES CITED

The following references are of record in the file of this patent:

UNITED STATES PATENTS

| Number | Name | Date |
|---|---|---|
| 2,151,917 | Hyland | Mar. 28, 1939 |
| 2,234,587 | Budenbom | Mar. 11, 1941 |
| 2,403,967 | Busignies | July 16, 1946 |
| 2,406,858 | Shepherd | Sept. 3, 1946 |
| 2,407,281 | Johnson et al. | Sept. 10, 1946 |
| 2,408,039 | Busignies | Sept. 24, 1946 |
| 2,409,456 | Tolson | Oct. 15, 1946 |

FOREIGN PATENTS

| Number | Country | Date |
|---|---|---|
| 543,222 | Great Britain | Feb. 16, 1942 |